Jan. 31, 1928.

J. G. BLUNT 1,657,777

TRUCK FOR LOCOMOTIVE ENGINES

Filed April 21, 1926

INVENTOR
James G. Blunt
BY
Clarence Kerr
ATTORNEY

Patented Jan. 31, 1928.

1,657,777

UNITED STATES PATENT OFFICE.

JAMES G. BLUNT, OF SCHENECTADY, NEW YORK.

TRUCK FOR LOCOMOTIVE ENGINES.

Application filed April 21, 1926. Serial No. 103,456.

My invention relates to four wheel trucks for locomotive engines and has for its object an improved construction wherein the journal bearings are located outside of the wheels. A further object is the entire elmination of bolted connections comprising the fastening for the principal elements of the structure, and a still further object is to provide a truck capable of meeting satisfactorily all conditions of rough or uneven trackway with no additional means other than those forming parts of the truck structure itself.

The increasing length of locomotive runs requires that the engine truck journal bearings be frequently examined as to the condition of the lubricating means, and where the journals are located inside the wheels, it is a difficult task for men to go beneath the locomotive, remove the truck box cellars, replenish the lubricant supply and replace the cellars within the short space of time available. It is, therefore, of distinct advantage to locate the journal bearings more accessibly in order to facilitate lubrication and repairs, when required, and to insure that this important task is not hampered or neglected due to difficult structural conditions. To this end, the journals are located outside of the wheels making them equally as accessible as the journal boxes on the ordinary tender or car truck. The truck structure below the bolster is preferably composed of four cast members, two of each of which are alike, and hence require in casting but two patterns. The joining of the longitudinal side members with the transverse end members is by means of trunnions permitting the sides of the truck to rise and fall relatively to each other due to inequalities in the track. Each transverse end member contains the two journal bearings for that end of the truck and the side members trunnioned thereon cooperating with the springs serve to equalize the weight on each of the journals.

Figure 1:
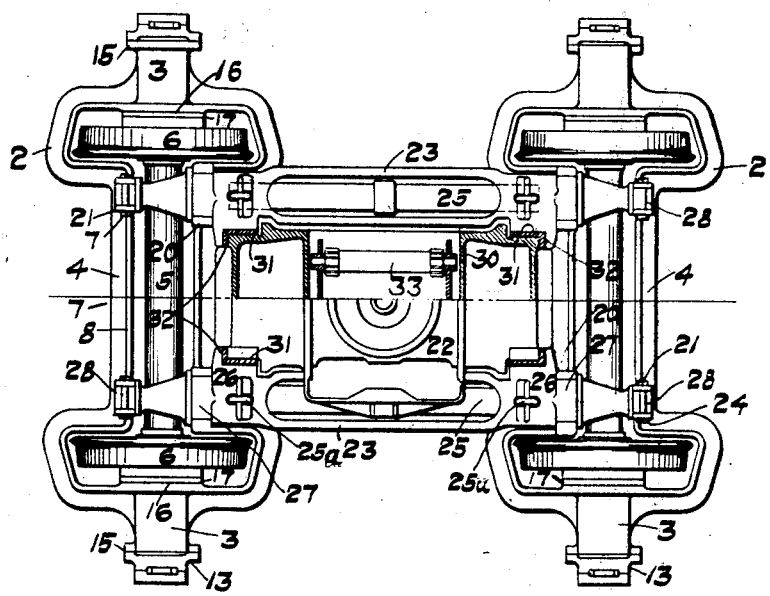
Figure 2:
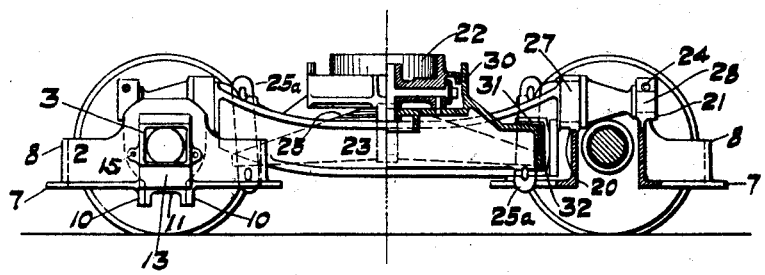
Figure 3:
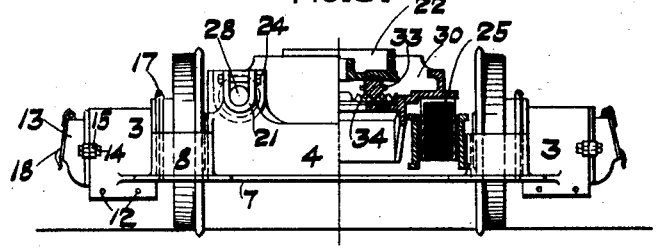

In the accompanying drawing: Figure 1 is a plan view, partly in section, of a four wheel locomotive truck, embodying my invention; Fig. 2, a side view of the truck, half in elevation and half in longitudinal central section; and, Fig. 3, a front end view of the truck, half in elevation, and half in vertical transverse central section.

The improvement claimed is hereinafter fully set forth.

In the practice of my invention referring descriptively to the specific embodiment thereof which is herein exemplified, I provide a truck frame having two transverse end frame members 2 each preferably formed as an integral casting, which embodies a journal box or housing 3, on each of its ends. Each end frame member 2 consists of two girders 4 which have parallel portions on either side the axle 5 and yoke shaped portions about the wheels 6 which merge into the journal housings 3. Each girder has a bottom flange 7 and vertical web 8 on its inner face. The flanges 7 and webs 8 are preferably continuous from one journal housing to the other at the opposite end of the member 2. For purposes of assembly, it is necessary that these journal housings 3 be open at the bottom so that the axle 5 may be inserted, the space between the journal box jaws 10 being closed by binder 11 secured by bolts 12 and forming a flat top surface on which combined cellars and end covers 13 are slidably inserted from the outside and secured to the journal boxes by bolts 14 passing through suitable lugs 15. The face 16 next the wheel hub is adapted to receive the renewable hub liners 17. Ordinary car journal box lids 18 may be used with the cellar end covers thereby making the operation of examining or renewing the lubricant in the cellars as easy an operation as it now is on tender and car trucks. In the yoke shaped portions of the girders 4 the vertical depth of the web 8 is reduced to produce clearance from the locomotive cylinder (not shown) and to permit removal of cylinder parts. On the top edges of girders 4 just inside of the wheels are formed semicircular trunnion bearings 20 and 21 open at the top for the reception of trunnions formed on the ends of the side frame members. The inner ones 20 or the ones nearest the center 22 of the truck are the larger of the two, and are designed to carry the total weight but the outer and smaller trunnion bearings 21 are intended to produce added stability. When the side frame members 23 have been placed in position in these trunnion bearings 20 and 21, bolts 24 prevent the side and end frame members from becoming disconnected.

Each side frame member 23 is preferably formed of channel sections, the sections being spaced sufficiently far apart to permit springs 25 and hangers 25$^a$ to be located between them and connected by top walls 26 extending inwardly from the ends to enclose partially the spring hangers. At their extremities the members 23 are formed into different sized collared trunnions 27 and 28 for engagement respectively with the different sized bearings 20 and 21 of the transverse truck end members 2.

A truck bolster 30, substantially in the form of a plate with upwardly and downwardly extending flanges, is supported on the springs 25. The bolster 30 is recessed at each of its corners for the reception of spacing shoes 31. These shoes 31 are suitably attached to the bolster 30, preferably by lips at top and bottom, and serve to space the truck side members 23 apart and also to transmit the push of the truck bolster to the truck frame. When these shoes are applied to the bolster and the bolster lowered into place, they are completely housed and therefore cannot become disconnected or displaced. Their front faces 32 are oppositely bevelled at top and bottom to permit one end of the truck to rise and fall relatively to the other end without disturbing the equilibrium of the truck bolster.

The centering device shown consists of toothed rollers 33 meshing with toothed racks 34 on oppositely inclined planes, let into the truck bolster 30 and correspondingly toothed racks formed in the under side of center plate 22.

I claim as my invention and desire to secure by Letters Patent:

1. A frame for locomotive trucks of the outside bearing type, comprising a pair of transverse members, each formed at each end with a horizontal loop for fitting across a wheel, the outer portion of each loop carrying a journal box; a pair of longitudinal side frame members; trunnion bearings on each of the transverse members; and a trunnion, projecting longitudinallly from each end of each side frame member, and fitted in one of the bearings on the transverse members.

2. In a four wheel truck of the outside bearing type, the combination of a pair of transverse members, each provided at each end with a horizontal loop for fitting across a wheel, the outer portion of each loop carrying a journal box; a pair of longitudinal side frame members, each having spaced side walls providing a spring pocket; springs in each of said pockets; a bolster, bearing on said springs; trunnion bearings on each transverse member, between the loops thereof; and a trunnion, projecting longitudinally from each end of each side frame member and fitting in one of the bearings on the transverse members.

3. In a four wheel truck of the outside bearing type, the combination of a pair of transverse members, each provided at each end with a horizontal loop for fitting across a wheel, the outer portion of each loop carrying a journal box; a pair of longitudinal side frame members, each having spaced side walls, providing a spring pocket; a leaf spring in each pocket; a hanger, connecting each end of each spring to a side frame member; a bolster, bearing on the springs; a centre plate; a lateral motion centering device, interposed between the bolster and centre plate; trunnion bearings on each transverse member; and a trunnion projecting longitudinally from each end of each side frame member, and fitted in one of the bearings on the transverse members.

4. A frame for locomotive trucks of the outside bearing type, comprising a pair of transverse members, each formed as an integral casting, and embodying a horizontal loop at each end for fitting across a wheel, the outer portion of each loop embodying a journal box, a pair of spaced members, connecting the loops, and two pairs of trunnion bearings disposed on each transverse member, one bearing of each pair being disposed on each of the spaced members; and a pair of longitudinal side frame members, each having a trunnion projecting longitudinally from each of its ends and fitted in a pair of the bearings.

JAMES G. BLUNT.